M. L. BERNSTEIN.
AUTOMOBILE ATTACHMENT.
APPLICATION FILED AUG. 10, 1911.
1,052,559.
Patented Feb. 11, 1913.
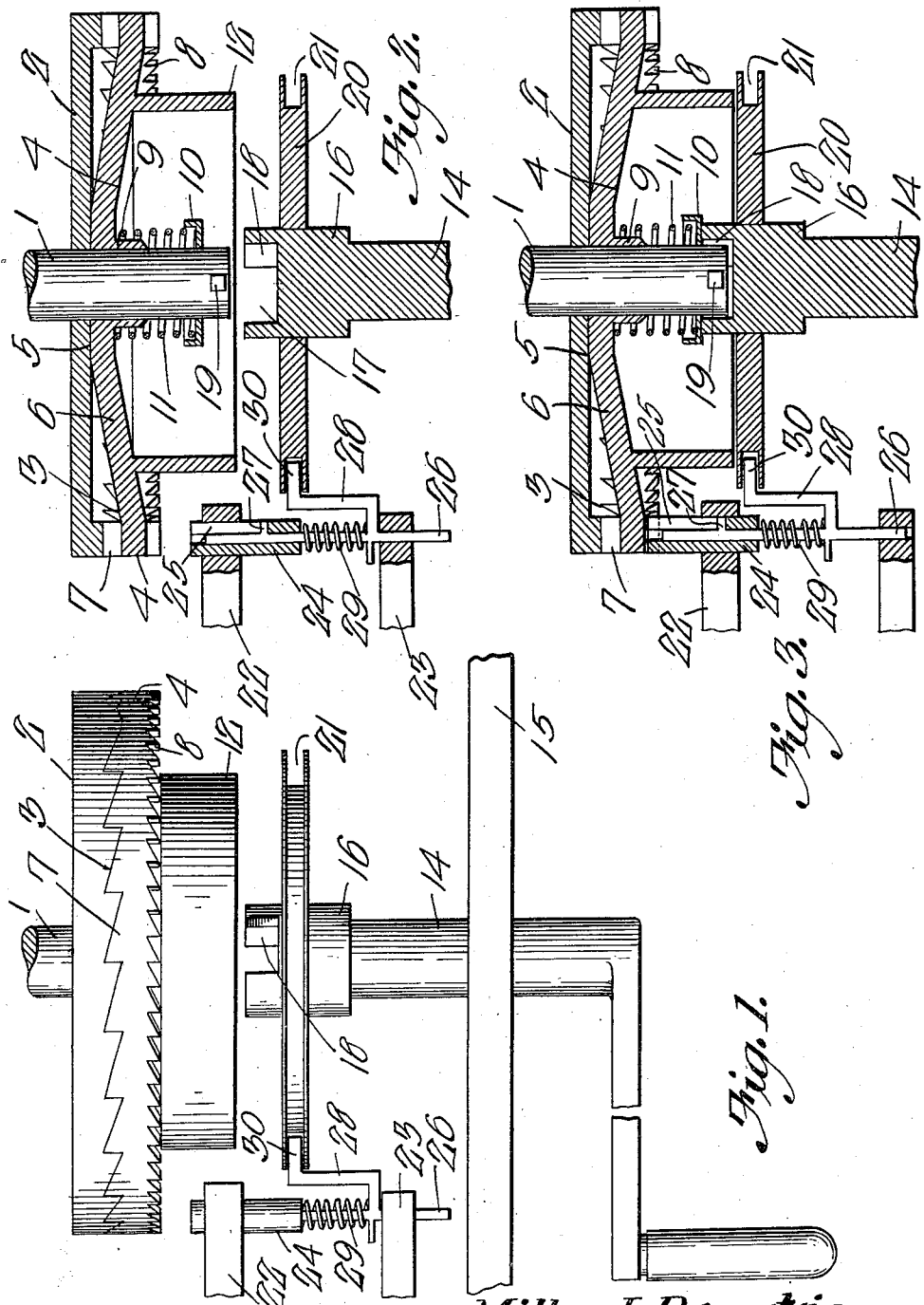
Witnesses
Milton L. Bernstein, Inventor
by C. A. Snow & Co.
Attorneys

UNITED STATES PATENT OFFICE.

MILTON L. BERNSTEIN, OF NEW YORK, N. Y.

AUTOMOBILE ATTACHMENT.

1,052,559.   Specification of Letters Patent.   Patented Feb. 11, 1913.

Application filed August 10, 1911. Serial No. 643,416.

*To all whom it may concern:*

Be it known that I, MILTON L. BERNSTEIN, a citizen of the United States, residing at New York, in the county of New York and State of New York, have invented a new and useful Automobile Attachment, of which the following is a specification.

It is the object of the present invention to provide a means for starting an internal combustion engine, without danger to the operator, through back-firing.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in top plan; Fig. 2 is a transverse section showing the parts in the positions which they will assume when the engine is running; and Fig. 3 is a transverse section showing the parts in the positions which they will assume while the engine shaft is being rotated manually, to effect a starting of the engine.

Referring to the drawings, the engine shaft is denoted generally by the numeral 1. Fixed to the engine shaft 1, for rotation therewith, is a wheel 2, having outstanding teeth 3 upon its rear face. Journaled for rotation upon the shaft 1, to the rear of the wheel 2, is a wheel 4, which may have a bearing in its intermediate portion, as shown at 5, against the wheel 2, the wheel 4 being inclined if desired, as shown at 6, beyond its bearing portion 5, so as to space its periphery apart from the wheel 2. Teeth 7 are formed upon the front face of the wheel 4, the teeth 7 being adapted to engage with the teeth 3 of the wheel 2. Upon its rear face, the wheel 4 is supplied with teeth 8. Projecting rearwardly from the wheel 4, and surrounding the shaft 1 is a bearing collar 9. Secured to the shaft 1 in spaced relation with respect to the collar 9, is a fixed abutment 10, a compression spring 11 surrounding the collar 9 and abutting at one end against the wheel 4, the opposite end of the spring 11 abutting against the member 10, the same having a forwardly projecting flange, adapted to inclose the rear end of the spring. The wheel 4 is equipped with an integrally formed, rearwardly projecting flange 12, having functions which will be set forth hereinafter.

The invention further includes a crank 14, mounted for sliding movement in a suitable support 15, which may be any portion of the crank case, or any portion of the engine frame. At its forward end, the crank 14 is equipped with a head 16, having an opening 17, adapted to receive the rear end of the engine shaft 1. The head 16 is formed within the opening 17, with the shoulder 18, adapted to engage a pin or like projection 19, outstanding from the engine shaft 1, the obvious coöperation between the elements 19 and 18 being such that a rotation of the crank 14 will cause a rotation of the shaft 1, when the crank 14 is slid forwardly into engagement with the engine shaft. The crank 14 is provided with a lateral extension 20, provided with a peripheral groove 21.

The numerals 22 and 23 indicate a pair of guides, which may be any convenient or accessible portions of the engine frame or the like. Slidably mounted in the guide 22, is a pawl 24, adapted to engage with the teeth 8 of the wheel 4. The pawl 24 is hollow, and receives, slidably, one end of a pawl-controlling member 26, the rear end of which is slidably mounted in the guide 23. There is a longitudinal slot 25 in the side wall of the pawl 24, and in this slot 25 reciprocates a finger 27, fashioned upon one side of the pawl-controlling member 26. The pawl-controlling member includes an angular extension 28, and a compression spring 29 is interposed between the angular extension 28 and the rear end of the pawl 24. The angular extension 28 of the pawl-controlling member terminates in a finger 30, received within the groove 21 of the extension 20 of the crank 14, the construction being such that the crank 14 may be rotated independently of the finger 30. When, however, the crank 14 is slid longitudinally, the extension 20 of the crank will cause a longitudinal reciprocation of the pawl-controlling member 26.

The spring 11 serves to maintain the teeth 7 and 3 normally in engagement, and the construction is such, therefore, that when the engine shaft 1 is rotating, the wheels 2 and 4 will rotate with the engine shaft. When it is desired to rotate the engine shaft 1 manually, the crank 14 is slid forwardly, to engage with the rear end of the engine shaft. At the same time, the extension 20 of the crank, engaging the finger 30, will slide the pawl-controlling member 26 forwardly, putting the spring 29 under compression, and advancing the pawl 24, into engagement with the teeth 8. If the crank 14 be now rotated, obviously the engine shaft 1 will be rotated likewise.

Should back-firing occur, resulting in a reverse rotation of the shaft 1, the pawl 24 will prevent the wheel 4 from being rotated in a reverse direction. However, as soon as a reverse rotation of the engine shaft occurs, due to back-firing, the engagement between the teeth 3 and 7 will effect a separation of the wheels 2 and 4. The flange 12 will thus be advanced against the extension 20 of the crank shaft, and the crank shaft will be moved rearwardly, breaking the engagement between the elements 18 and 19, whereby the shaft 1 may rotate independently of the crank 14. The rearward sliding movement of the extension 20, under the action of the flange 12, will cause a rearward retraction of the pawl-controlling member 26, the finger 27 of which, engaging the pawl 25, will retract the pawl 25 out of engagement with the teeth 8. Under the circumstances last above pointed out, it will be seen that a forcible rotation of the shaft, due to back-firing, will serve to disconnect the shaft from the crank mechanism, and to render the crank mechanism totally ineffective to injure the operator of the device.

Having thus described the invention, what is claimed is:—

1. In a device of the class described, a shaft; a member rotatable upon the shaft and having sets of teeth in its opposite faces; a member fixed upon the shaft and having teeth to engage with one set of teeth of the rotatable member; spring means for holding the members together; a pawl slidably mounted, and adapted to engage the other set of teeth of the rotatable member; spring means for operating the pawl; a crank slidably mounted for engagement with the shaft; an extension upon the crank, provided with means to engage the last specified spring means; the rotatable member having an outstanding flange adapted to engage with the extension of the crank.

2. In a device of the class described, a slidably mounted pawl; a pawl-controlling member slidably connected with the pawl; a spring interposed between the pawl-controlling member and the pawl; a slidably mounted crank rotatably connected with the pawl-controlling member; a shaft with which the crank is adapted to engage; a member rotatable upon the shaft and having sets of teeth in its opposite faces, one of said sets of teeth being engageable by the pawl; a member fixed upon the shaft and having teeth to engage with the other set of teeth of the rotatable member; spring means for holding the fixed member and the rotatable member together; the rotatable member being adapted to engage the crank when the fixed and rotatable members are separated.

In testimony that I claim the foregoing as my own, I have hereto affixed my signature in the presence of two witnesses.

MILTON L. BERNSTEIN.

Witnesses:
 AUBRAY R. BARNET,
 OTTO KRAMER.

---

Copies of this patent may be obtained for five cents each, by addressing the "Commissioner of Patents, Washington, D. C."